United States Patent [19]

Romero

[11] 4,180,277
[45] Dec. 25, 1979

[54] MOVABLE STORAGE AND/OR DISPLAY APPARATUS

[75] Inventor: Victor R. Romero, Sheridan Township, Calhoun County, Mich.

[73] Assignee: Eagle Picher Industries, Inc., Cincinnati, Ohio

[21] Appl. No.: 894,429

[22] Filed: Apr. 7, 1978

[51] Int. Cl.² ............................................. B62B 3/02
[52] U.S. Cl. .................................... 280/79.3; 220/19
[58] Field of Search ................ 280/79.1, 79.3; 220/19, 220/6; 211/134

[56] References Cited

U.S. PATENT DOCUMENTS

| 3,372,829 | 3/1968 | Averill ............................ 280/79.3 X |
| 3,388,920 | 6/1968 | Hill, Sr. et al. ................ 280/47.18 X |
| 4,099,735 | 7/1978 | Becker ................................. 280/79.3 |

FOREIGN PATENT DOCUMENTS 260386  3/1949  Switzerland ............................ 280/79.3

Primary Examiner—Richard A. Bertsch
Assistant Examiner—Michael Mar
Attorney, Agent, or Firm—Blanchard, Flynn, Thiel, Boutell & Tanis

[57] ABSTRACT

A movable storage and/or display apparatus, such as a mobile merchandising cart, having a basket removably supported thereon. The apparatus includes a frame having a wheeled base and a pair of upright posts fixed to the base and extending upwardly therefrom adjacent the rear corners thereof. Each post comprises a plurality of vertically spaced notches. The basket comprises bottom, front and side walls which are hingedly connected together so as to be foldable into a substantially flat, collapsed condition. The basket also has a removable rear wall. The rear edges of the side walls of the basket are hooked into the notches. The rear edges of the side walls also have connectors which releasably interconnect with mating connectors on the rear wall so that the rear wall can be removably attached to the side walls. The walls are preferably of wire mesh construction and define a rectangular basket. The front wall of the basket preferably has one or more panels which can be folded down to expose the contents of the basket.

13 Claims, 8 Drawing Figures

MOVABLE STORAGE AND/OR DISPLAY APPARATUS

FIELD OF THE INVENTION

This invention relates to a movable storage and/or display apparatus and, in particular, to an improved mobile merchandising cart having a basket removably supported thereon.

The present invention was initially developed as an apparatus for transporting and displaying items of merchandise in supermarkets, discount stores and other retail establishments and the following description will proceed with reference thereto. It is to be understood, however, that the apparatus according to the invention is usable for a variety of additional purposes such as the transportation and storage of parts in a manufacturing plant, or laundry, or other solid items which are to be transported and stored in bulk.

DESCRIPTION OF THE PRIOR ART

U.S. Pat. No. 4,037,851 discloses a store merchandising apparatus in which one or more shelves are removably supported on a movable support frame. The mode of use and advantages of that apparatus are set forth in the patent and reference may be made to the patent for further details. However, the types of articles that can be transported and displayed on the apparatus of U.S. Pat. No. 4,037,851 are limited both as to size and number because of the shelf construction thereof. There is a need for a movable storage and/or display apparatus in which bulky items, such as paper towels, bags of animal food, etc., can be transported and displayed.

It is thus an object of the present invention to provide a movable storage and/or display apparatus, such as a mobile merchandising cart, which possesses all of the advantages possessed by the apparatus of U.S. Pat. No. 4,037,851, and in addition possesses the further advantage that large numbers of loose and/or bulky items can be stored and displayed therein.

A further object of the invention is to provide a movable storage and/or display apparatus, as aforesaid, comprising a large size basket having bottom, front, side and rear walls which walls can be folded flat in order to minimize space requirements during storage and transportation of the apparatus, prior to use in a store or the like.

A further object of the invention is to provide a movable storage and/or display apparatus, as aforesaid, which has a plurality of openable panels in the front wall thereof so that the entirety of the contents thereof can be removed easily and conveniently.

A still further object of the invention is to provide a movable storage and/or display apparatus, as aforesaid, in which the entire rear wall of the basket can be removed to expose the entire contents thereof for selection by the customer.

Another object is to provide a movable storage and/or display apparatus, as aforesaid, which is economical to manufacture and durable in operation, and which can be easily and safely moved about when fully assembled and loaded with merchandise.

It is also an object of the present invention to provide a movable storage and/or display apparatus, as aforesaid, which can be readily grouped with stationary store display equipment so as to be compatible in operation and similar in appearance thereto and which additionally can be grouped with movable shelf-type display apparatuses of the type shown in U.S. Pat. No. 4,037,851.

Other objects and purposes of the invention will be apparent to persons familiar with such equipment upon reading the following specification and inspecting the accompanying drawings.

Figure 2:
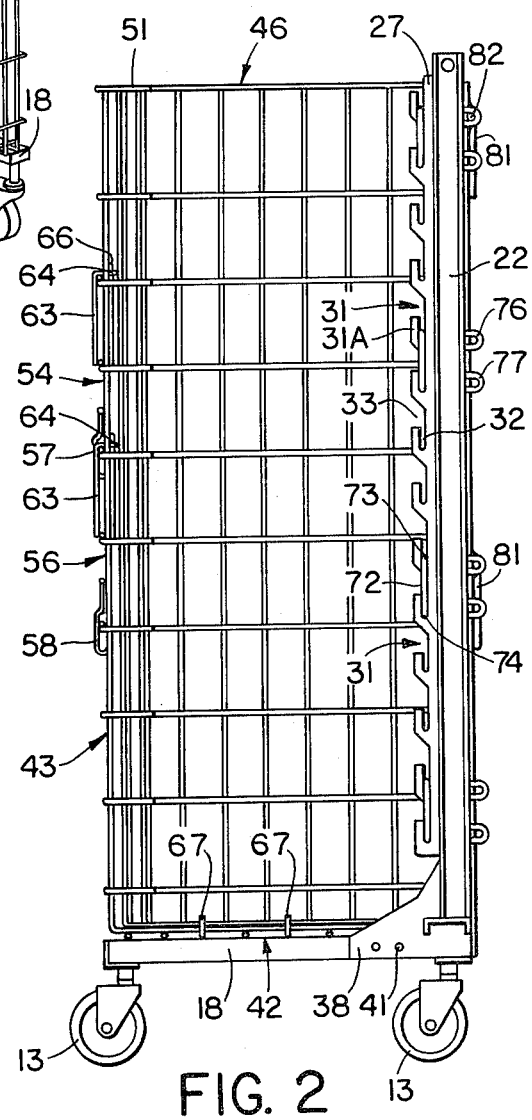
FIG. 2 is a side view of the apparatus.
Figure 3:
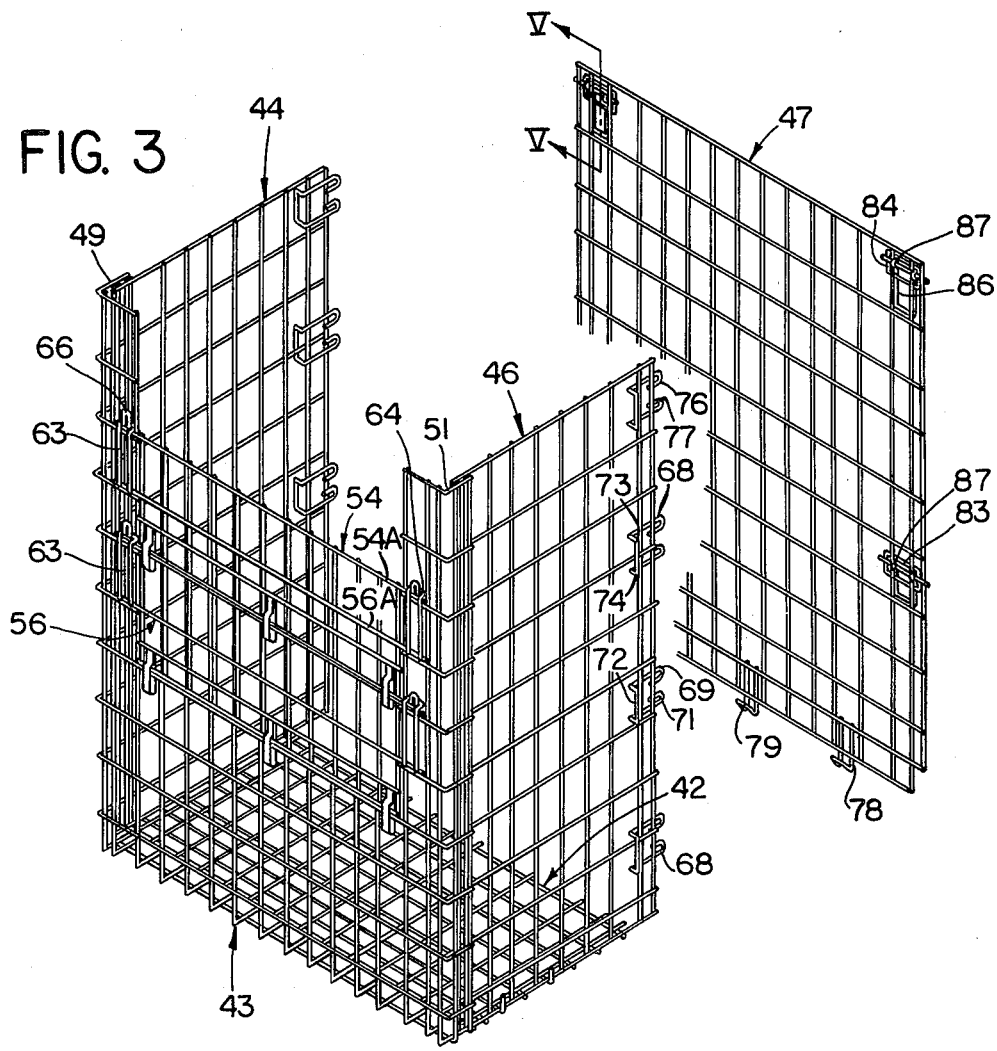
FIG. 3 is a perspective view of the basket of the apparatus.
Figure 4:
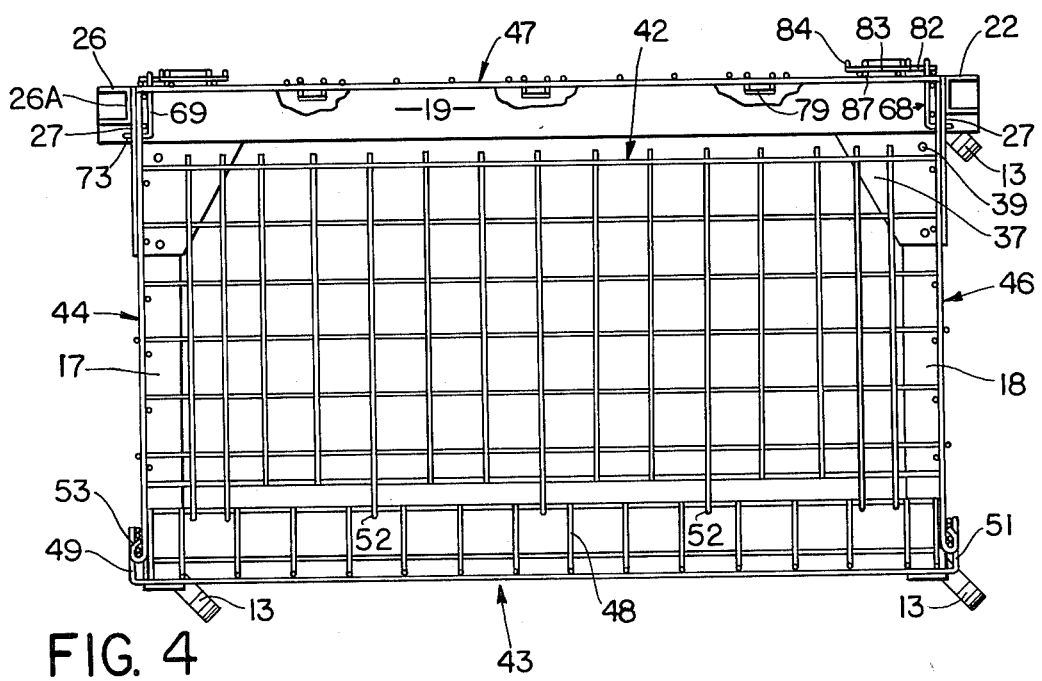
FIG. 4 is a top view of the apparatus.
Figure 5:
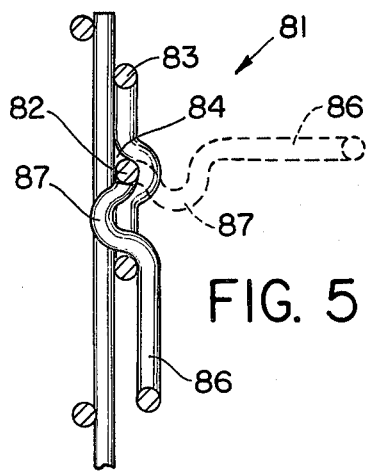
FIG. 5 is a sectional view taken along the line V—V of FIG. 3.

Certain terminology will be used in the following description for convenience in reference only and will not be limiting. For example, the words "upwardly," "downwardly," "rightwardly" and "leftwardly" will refer to directions in the drawings to which reference is made. The words "front" and "rear" will refer to the left and right sides, respectively, of the apparatus illustrated in FIG. 2. The words "inwardly" and "outwardly" will refer to directions toward and away from, respectively, the geometric center of the apparatus and designated parts thereof. Said terminology will include the words specifically mentioned, derivatives thereof and words of similar import.

SUMMARY OF THE INVENTION

The objects and purposes of this invention are met by providing a movable storage and/or display apparatus having a wheeled base and a basket removably mounted thereon. A pair of upright posts are fixed to the base and project upwardly therefrom in substantially parallel relationship. Each of the upright posts has a notched strip associated therewith. The basket is adapted to be removably mounted on the posts. The basket is comprised of bottom, front and side walls which are hingedly connected together so as to be foldable into a substantially flat, collapsed condition. The basket also has a removable rear wall. The rear edges of the side walls are provided with one or more pairs of horizontally extending, vertically spaced rod portions. These rod portions are receivably engaged within notches formed in the strips for mounting the basket on the posts. The rear wall has connecting means which are releasably connectable with mating connecting means on the rear edges of said side walls so that the rear wall can be releasably connected with the side walls. The front wall of the basket has one or more panels which can be moved outwardly and downwardly to expose the contents of the basket. The walls of the basket preferably are of wire mesh construction.

DETAILED DESCRIPTION

Figure 1:
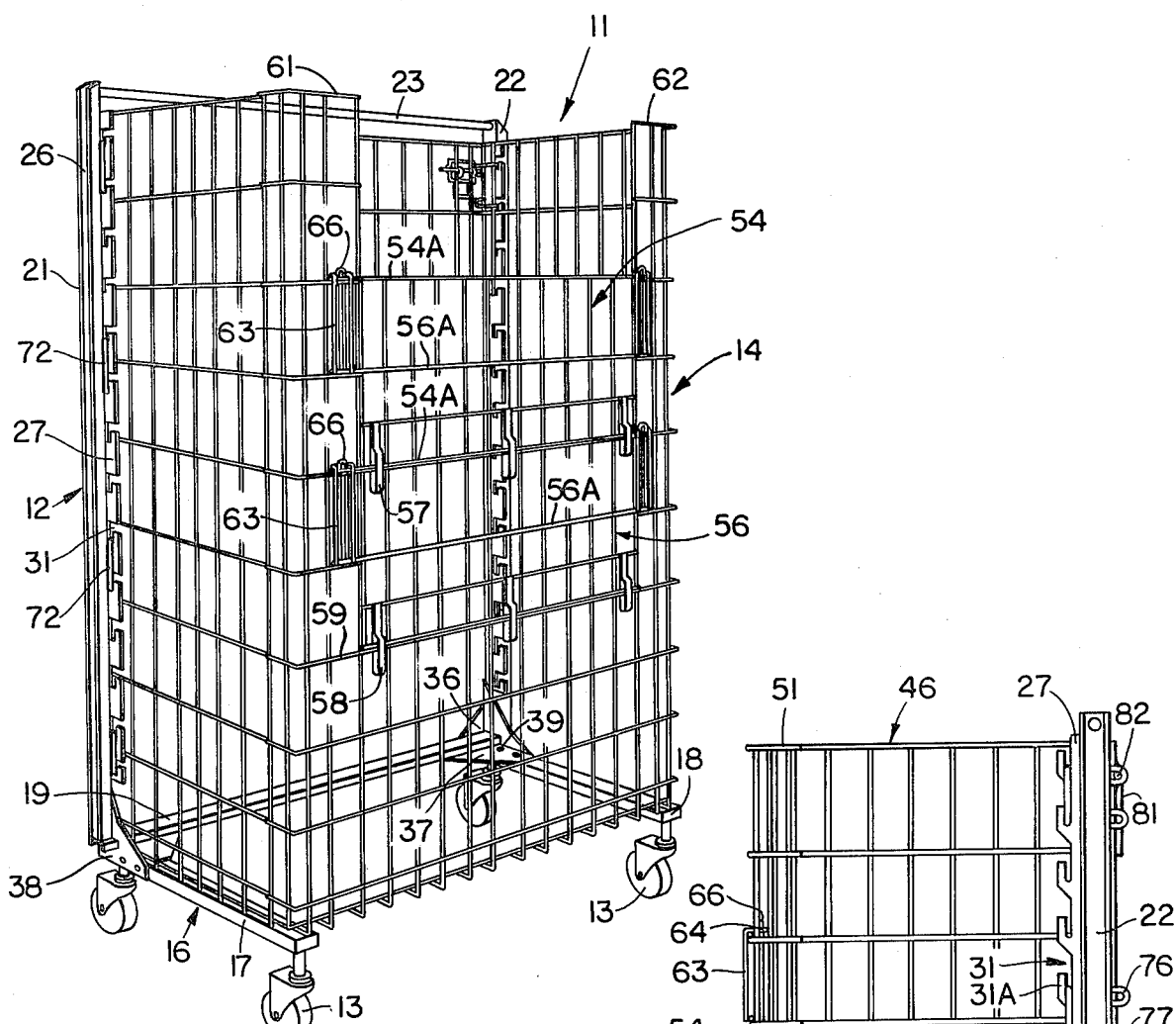
FIG. 1 is a perspective view of a movable storage and/or display apparatus according to the present invention.

FIG. 1 illustrates therein a movable storage and/or display apparatus 11 according to the present invention. The apparatus 11 includes a frame 12 having a plurality, here four, of rollers or casters 13 for rollingly supporting the apparatus. A removable basket 14 is adapted to be mounted on the frame 12.

The frame 12 illustrated in the drawings is substantially the same as the frame shown in U.S. Pat. No. 4,037,851. The frame 12 includes a substantially U-shaped base 16 which has substantially parallel legs 17 and 18 joined by a cross brace 19 of inverted channel shape. A pair of substantially parallel upright posts 21 and 22 project vertically upwardly from the base 16 adjacent the rear corners thereof. The posts 21 and 22 are also fixedly interconnected adjacent their upper ends by means of a tubular cross brace 23 extending therebetween. The upright posts 21 and 22 are identical except for being mirror images of one another.

The upright post 21 includes a vertically elongated channel member 26 which opens sidewardly of the cart and has a platelike mounting member or strip 27 fixed thereto, which strip 27 extends longitudinally of the channel member 26 throughout substantially the complete length thereof. A rear portion of the strip 27 is fixedly secured to the bottom wall 26A of the channel member 26, as by being welded thereto. The front portion of the strip 27 projects beyond the front edge of channel member 26 toward the front of the cart. The front portion of strip 27 has a plurality of notches 31 formed therein. The notches 31 are vertically spaced along the length of the strip 27 and define vertical hooks 31A which open upwardly and outwardly of the strip. Each notch 31 includes a substantially vertically elongated slot 32 which is closed at its bottom and its upper end communicates with a transversely extending slot 33 which opens outwardly through the front free edge of the strip 27.

The lower ends of the posts 21 and 22 are each fixedly secured with respect to the U-shaped base 16. For this purpose, each corner of the U-shaped base has three mutually perpendicular gusset plates 36, 37 and 38 associated therewith, which plates fixedly interconnect the cross brace 19, the respective upright post 21 or 22, and the respective leg 17 or 18 in mutually perpendicular relationship.

The rear gusset plate 36 is disposed substantially vertically and overlies the rear leg of the channel member 26 and the rear wall of the cross brace 19, which gusset plate is suitably welded to these two members. The horizontal gusset plate 37 passes under and is welded to the lower surface of the cross brace 19, which gusset plate horizontally overlies the upper surface of the respective leg 17 or 18 and is suitably fixed thereto, as by bolts 39. The remaining gusset plate 38 also extends vertically and is welded to the outer surface of the rear wall 26A of the channel member 26, which gusset plate 38 projects forwardly so as to overlap the outer side wall of the respective leg 17 or 18. The gusset plate 38 is fixedly secured to the respective leg 17 or 18, as by further bolts 41.

The basket 14 is comprised of a bottom wall 42, a front wall 43, a pair of side walls 44 and 46 and a rear wall 47. The basket 14 is of rectangular cross-section and it normally is made of wire rod construction.

The front wall 43 is generally planar and it has a rearwardly projecting horizontal portion 48 along its lower edge and a pair of rearwardly projecting vertical portions 49, 51 along its respective side edges. The forward end of the bottom wall 42 is hingedly connected to the rearward end of the horizontal portion 48 at the lower end of the front wall 43 by means of wire rod loops 52 whereby the bottom wall 42 can be folded upwardly substantially parallel with the front wall 43. The forward edges of the side walls 44 and 46 are hingedly connected to the rearwardly projecting vertical portions 49, 51 along the respective side edges of the front wall 43 by means of wire rod loops 53, whereby the side walls 44 and 46 can be folded inwardly toward each other into overlapping relationship with each other and substantially parallel with the front wall 43. It will be noted that the hinge axes for the side walls 44 and 46, defined by wire rod loops 53, are offset forwardly relative to the hinge axis for the bottom wall 42, defined by wire rod loops 52. Thus, in the folded condition of the basket wherein the walls are disposed substantially parallel to each other, the side walls 44 and 46 are located between the bottom wall 42 and the front wall 43. Thus when disconnected from the frame 12, the side, front and bottom walls can be folded into a compact unit in order to minimize shipping space and the space required for storing the basket when it is not in use.

The front wall 43 has two drop panels 54, 56 which are connected so that they can releasably be held in an upright position. The lower edge of the upper drop panel 54 is hingedly connected by strap-type hinges 57 to the upper edge of the lower drop panel 56. The lower edge of the lower drop panel 56 is hingedly connected by strap-type hinges 58 to a horizontal wire 59 of the front wall 43. The strap-type hinges 57 and 58 have vertically elongated recesses to permit limited vertical movement of the drop panels relative to the rods that pass through the recesses in the hinges. The drop panels 54 and 56 each have horizontal rods 54A and 56A projecting beyond the edges of the drop panels and into overlapping relationship with the fixed lateral portions 61 and 62 of the front wall 43 on either lateral side of the drop panels. Upwardly extending latches, each in the shape of a substantially inverted U-shaped loop 63, are secured to the rods 54A, 56A adjacent the ends thereof. The upper bight portions 64 of the loops 63 are bent inwardly in a substantially horizontal direction so as to project between two vertical wires of the fixed lateral portions 61 and 62 of the front wall. The fixed lateral portions 61 and 62 have U-shaped keepers 66 which project upwardly into the bight portions 64 of the latches. Thus, in the upright positions of the drop panels 54 and 56, the keepers 66 prevent forward hinging movement of the drop panels. When it is desired to drop the panel 54 downwardly, it is first vertically raised so that bight portions 64 of its latches clear the upper ends of the keepers 66 and then the drop panel is swung outwardly and downwardly. Panel 56 can be opened in like fashion. The drop panels 54 and 56 can be releasably positioned in their upright closed positions by a reverse sequence of steps. Thus, in use, as the contents of the basket are removed, first the top drop panel 54 and then the lower drop panel 56 can be dropped into a downwardly hanging position so that the entire contents of the basket can be reached easily.

The bottom wall 42 is of planar construction and it forms the bottom of the basket. In the erected condition of the basket, the side edges of the bottom wall 42 rest on the legs 17 and 18, and the rear edge thereof rests on the gusset plates 37. The side edges of the bottom wall have upstanding rod projections 67 which limit outward swinging of the side walls 44 and 46 so that said side walls extend substantially perpendicular to the front wall 43.

The side walls 44 and 46 each have a plurality of vertically spaced connecting structures 68 attached thereto adjacent the rear edge thereof. Four connecting structures 68 are provided on each of the side walls 44 and 46, but this number is subject to variation depending on the weight of the load to be handled by the basket. The connecting structures 68 each is generally U-shaped in plan view and comprises a pair of parallel legs 69, 71 and a bight portion 72. The legs 69 and 71 are secured, as by welding, to the two rearwardmost vertical rods of the side walls 44 and 46 on the inner sides thereof. The bight portion 72 of the connecting structure is bent at substantially a right angle to the legs and it is positioned so as to extend sidewardly beyond its associated side wall. The upper and lower leg portions 73, 74 of the bight are adapted to be received in two of the vertically spaced notches 31 in the front portions of the strip 27. That is, the leg portions 73 and 74 are vertically spaced-apart a distance corresponding to the vertical spacing between two of the slots 33. Thus, the erected basket is connected to the frame 12 by means of the leg portions 73 and 74 of the connector structures which fit into the slots 32 so that the basket is held against forward and lateral movement relative to the frame 12. Although the weight of the basket is primarily borne directly by the legs 17 and 18, if additional support is needed, the connecting structures can be designed so that the leg portions 73, 74 bottom in the slots 32.

The legs 69 and 71 project rearwardly beyond the rear edges of the side walls 44 and 46. The rearward ends of the legs 69 and 71 are reversely bent to define loops 76, 77.

The rear wall 47 is generally planar and it has a plurality of laterally spaced-apart retainers 78 along its lower edge. The retainers 78 are substantially U-shaped rods, the lower ends of which are bent forwardly and upwardly to form hooks 79. In the assembled condition of the rear wall on the frame 12, the hooks extend upwardly into the brace 19 so as to prevent the rear wall 40 from bowing outwardly.

The rear wall 47 has a plurality of latching bolt structures 81 adjacent the upright side edges thereof. The latching bolt structures 81 each have a laterally slidable latching bolt 82 which is receivable into one of the loops 76 or 77 on its associated side wall, whereby the rear wall 47 can be releasably retained in upright position. The latching bolt structure 81 can have a variety of different constructions. In the illustrated embodiment, the latching bolt structure 81 comprises a generally rectangular mounting element 83 secured, as by welding, to the rear wall and having recesses 84 for guiding lateral sliding movement of the latching bolt 82. A handle 86 is secured to the latching bolt 82 and is adapted to be pivoted away from the rear wall 47 and then moved laterally to insert the bolt into or remove it from the loop 76 or 77. The handle 86 has projections 87 which are engageable with the vertical rods of the rear wall when the handle is in a vertical position to releasably lock the bolt in position.

OPERATION

With the frame in assembled condition, the basket 14 is attached to the frame by placing the assembly of bottom wall 42, front wall 43 and side walls 44 and 46, wherein the walls are all parallel with each other as above described, onto the legs 17 and 18 with the front wall 43 extending transversely between and resting on said legs. At this time the wall assembly is a slight distance forwardly of its normal assembled position on the frame. The bottom wall 42 is then folded downwardly so as to rest on and extend rearwardly along the legs 17 and 18. Then, the side walls 45 and 46 are unfolded so as to extend lengthwise along the legs 17 and 18 toward the posts 21 and 22. The rear end of the wall assembly is tilted upwardly so that leg portions 73 and 74 can be extended into the corresponding transversely extending slots 33 in the strips 27, following which the rear end of the wall assembly is allowed to drop downwardly in order that the leg portions 73 and 74 are received in the corresponding vertical slots 32. Then the rear wall 47 is assembled by hooking the retainers 78 upwardly into the brace 19 and then the latching bolts 82 are slid laterally into the corresponding loops 76 or 77. In this fashion, the erected basket is releasably secured to the frame 12.

After the basket has been suitably mounted on the cart and loaded with merchandise, then the loaded cart can be readily moved about as desired. For example, the basket as mounted on the cart can be loaded in a store room, with the loaded cart then being moved into a display area. Further, the mobile loaded cart can be moved about to different locations within a store so as to provide for optimum exposure of the merchandise which is being displayed in the cart. This cart can also be moved into existing locations in a store which previously utilized stationary shelving without resulting in any loss of shelf or storage space.

In use, initially both of the drop panels 54 and 56 can be in the upright position and the contents of the basket can be removed by reaching over the top edge of the upper drop panel 54. When needed, the upper drop panel 54 can be swung outwardly and downwardly so that the contents of half-empty units can be removed. Then, the lower drop panel 56 can be swung outwardly and downwardly so that the remaining items can be removed easily and conveniently so that the basket can be emptied. This sequence of operation will be followed when the basket is filled with loose items that might easily fall out of the basket.

When the basket is filled with stacked items that will not easily fall out, then the rear wall 47 can be completely removed so that the rear side of the basket is fully open for access to the contents thereof.

While the apparatus has been illustrated and described as possessing only a single basket mounted on one side of the uprights 21 and 22, it will be appreciated that the present invention can also be modified so as to constitute a two-sided cart. That is, the base could be of a substantially H-shaped configuration so as to have legs which project outwardly from both sides of the upright posts 21 and 22, which upright posts 21 and 22 could also have strips 27 associated therewith which project outwardly from both sides of the posts thereby to define rows of notches or hooks on both sides of the uprights. In this manner, a pair of baskets could thus be provided on both sides of the cart. Such a double-sided cart is particularly desirable in those situations where it is desired to use the cart as a merchandising island having maximum exposure of goods while presenting a desirable appearance. In this two-sided cart, the rear walls 47 would not be used. Further, two baskets can be mounted in side-by-side relation by providing an intermediate post having two strips 27 so that the adjacent side walls of two like baskets can be attached thereto.

The frame 12 is comprised of three subassemblies; namely, the two identical caster beam units comprised of the respective legs 17 and 18 and the casters attached thereto, and the upright and bracing subassembly comprising the uprights 21 and 22, the gusset plates 36, 37 and 38 associated therewith, and the cross-braces 19 and 23. The upright and bracing subassembly is secured to the caster beam units by bolting as above described.

It will be noted that rear walls of the uprights 21 and 22 and the gusset plates 36 lie in a substantially vertical plane, and the casters can be disposed entirely forwardly of that plane so that the cart can be positioned closely adjacent upright walls in stores to fit into existing compartments therein. Also, all of the parts are located inside of the outer edges of the uprights 21 and 22, and the basket extends to said outer edges of the uprights so that the merchandise cart provides the maximum lineal storage and display area for the size of the cart, i.e., there is no wasted space.

MODIFICATIONS

Figure 6:
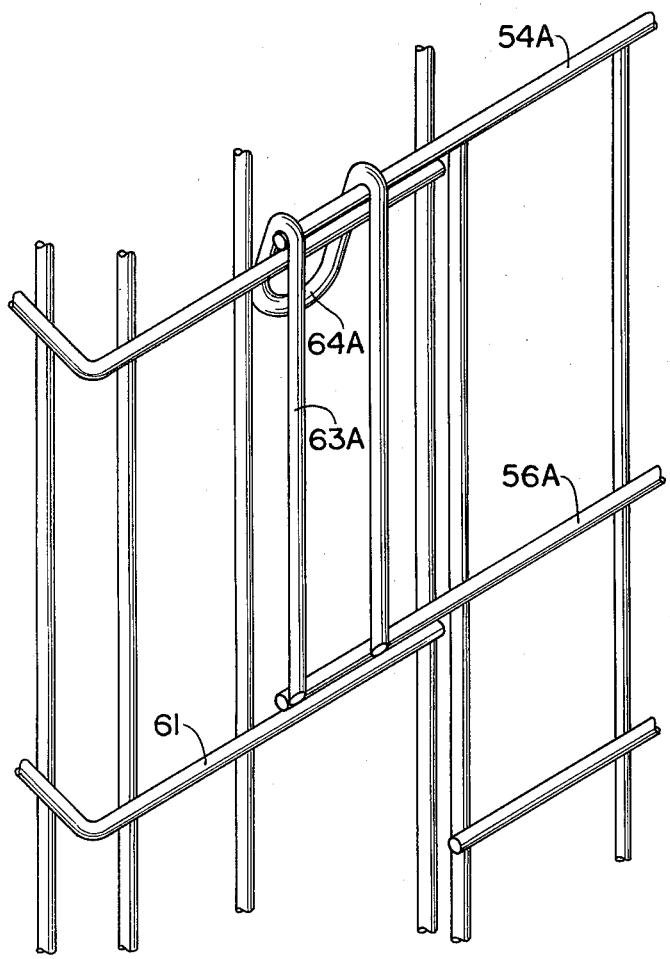
FIG. 6 is a perspective view showing a modified latch for the drop gates.

In FIG. 6, there is shown a modified latch structure for the drop panels 54 and 56 wherein the keepers 66 are omitted. In place thereof, the bight portions 64A of the loops 63A are reversely bent downwardly so as to partially encircle a horizontal rod on the portion 61, in the latched position of the drop panel.

Figure 7:
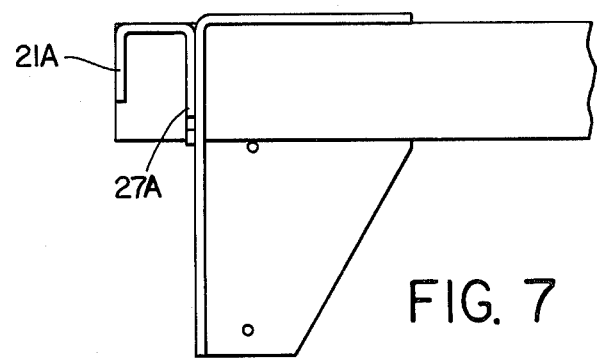
FIG. 7 is a top view showing a modified post.
Figure 8:
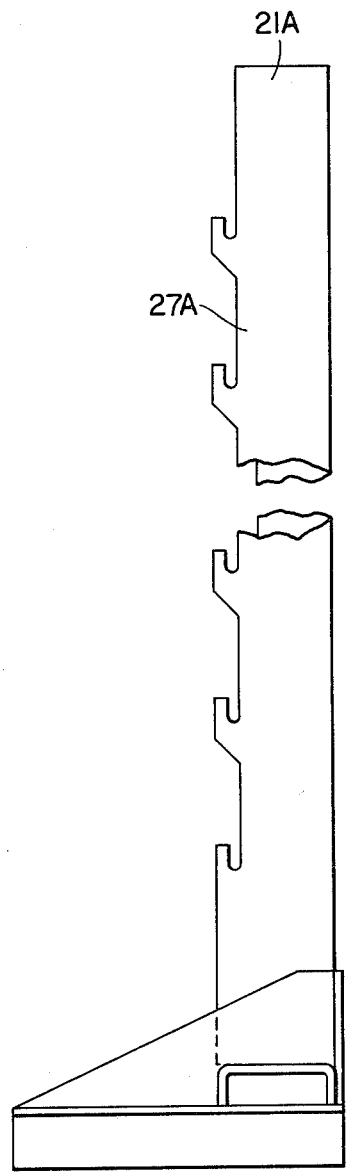
FIG. 8 is a side view of FIG. 7.

In FIGS. 7 and 8 there is shown a modified post 21A which is formed of a one-piece sheet bent into a frontwardly opening U-shape and wherein the notched strip 27A is an integral forwardly projecting extension of the laterally inner leg of the post. This corresponds to the post shown in FIGS. 8 and 9 of U.S. Pat. No. 4,037,851.

The apparatus provides essentially the same shelf space as conventional stationary shelving of the same dimensions. The apparatus can be loaded with merchandise in a back room or storage area of the retail store and can be wheeled into position in the store to replace a like apparatus from which the merchandise has been depleted. In this way, merchandise can be made more continuously available without having to stock the shelving with merchandise while the shelving is in the selling area.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A movable apparatus for storing and/or displaying objects, comprising:
   wheeled base means adapted to be moved along a support surface;
   a pair of upright posts mounted on said base means and extending upwardly therefrom, said posts being parallel and being spaced a selected distance apart;
   a basket mounted on said base means and extending frontwardly thereon relative to said posts, said basket comprising a bottom wall, a front wall, a pair of side walls and a rear wall which define a rectangular compartment for holding objects, said side walls and said bottom wall of said basket being hingedly connected to said front wall so that said side walls and said bottom wall can be unfolded from a storage position in which said walls are substantially parallel to each other to an erected position in which said walls define the bottom, front and sides of the rectangular compartment, said rear wall being separate from said bottom wall, said side walls and said front wall, and releasable latch means for releasably securing said rear wall to the rear edges of the side walls of the basket in the erected condition thereof;
   and connecting means on said posts for releasably engaging said basket.

2. A movable apparatus as claimed in claim 1 in which said front wall has a rearwardly extending horizontal portion along its lower edge and first hinge means hingedly connecting the forward end of said bottom wall to the rearward end of said horizontal portion of said front wall, said front wall also having a rearwardly extending vertical portion along each of its side edges and second hinge means hingedly connecting the forward ends of the side walls to the rearward ends of said vertical portions of said front wall respectively.

3. A movable apparatus as claimed in claim 1 wherein said front wall has at least one drop panel mounted thereon for movement between a first position in which it defines a portion of said front wall of said basket and a second position in which said portion is open.

4. A movable apparatus as claimed in claim 1 in which said connecting means has a plurality of vertically spaced notches having an upright slot having a closed bottom and a transversely extending slot at the upper end of said upright slot, said side walls having at the rearward ends thereof laterally extending leg portions receivable in said notches for releasably securing said side walls in said notches.

5. A movable apparatus as claimed in claim 4 wherein said base means comprises a U-shaped base having a pair of substantially parallel legs whose rearward ends are joined by a cross brace, said bottom, front and side walls of said basket being adapted to rest on said legs of said base.

6. A movable apparatus as claimed in claim 4 in which each post has an elongated vertical mounting member extending longitudinally thereof and projecting frontwardly therefrom toward the front of said apparatus, each mounting member having a plurality of said notches which are uniformly vertically spaced-apart and arranged in a vertical row which extends longitudinally of the post over a substantial portion of the length thereof, the notches in the mounting member of one of said posts each being horizontally aligned with a corresponding notch in the mounting member of the other of said posts.

7. A movable apparatus as claimed in claim 6 wherein said side walls have attached thereto substantially U-shaped connecting structures comprising a pair of legs extending parallel to and projecting rearwardly beyond the rear edges of said side walls, and a bight portion which is bent at a right angle to said legs and extends laterally outwardly from its associated side wall, said bight portion providing said leg portions which are receivable in a pair of notches in its associated mounting member, the rearward ends of said legs defining loops, and laterally slidable latching bolts mounted on said rear wall and adapted to be received in loops of said connecting structures for releasably securing said rear wall to said side walls.

8. A movable apparatus as claimed in claim 7 wherein said cross brace is of inverted channel shape and including retainers on the lower end of said rear wall and adapted for projecting upwardly into said cross brace to prevent rearward movement of said rear wall relative to said cross brace.

9. A movable apparatus as claimed in claim 7 wherein said walls are of wire mesh construction.

10. A movable apparatus for storing and/or displaying objects, comprising:
wheeled base means adapted to be moved along a support surface;
a pair of upright posts mounted on said base means and extending upwardly therefrom, said posts being parallel and being spaced a selected distance apart;
a basket mounted on said base means and extending frontwardly thereon relative to said posts, said basket comprising a bottom wall, a front wall, a pair of side walls and a rear wall which walls define a rectangular compartment for holding objects, said side walls being positioned in front of said posts and extending frontwardly therefrom, said rear wall being separate from said bottom wall, said side walls and said front wall and being individually removable from said basket, said rear wall extending between said side walls of the basket adjacent said posts;
connecting means on said posts for releasably engaging said basket and releasable latch means for releasably securing said rear wall in fixed position relative to said side walls.

11. A movable apparatus according to claim 10 wherein said front wall has at least one drop panel mounted thereon for movement between a first position in which it defines a portion of said front wall of said basket and a second position in which said portion is open.

12. A movable apparatus for storing and/or displaying objects, comprising:
wheeled base means adapted to be moved along a support surface;
a pair of upright posts mounted on said base means and extending upwardly therefrom, said posts being parallel and being spaced a selected distance apart;
a basket mounted on said base means and extending frontwardly thereon relative to said posts, said basket comprising a bottom wall, a front wall, a pair of side walls and a rear wall which define a rectangular compartment for holding objects, said side walls of said basket being hingedly connected to said front wall so that said side walls can be unfolded from a storage position in which said walls are substantially parallel to each other to an erected position in which said side walls and said front wall define the front and sides of the rectangular compartment, said rear wall being separate from said bottom wall, said side walls and said front wall and being individually removable from said basket, and releasable latch means for releasably securing said rear wall in fixed position extending between said side walls of the basket adjacent said posts in the erected condition thereof;
and connecting means on said posts for releasably engaging said basket.

13. A movable apparatus according to claim 12 wherein said front wall has at least one drop panel mounted thereon for movement between a first position in which it defines a portion of said front wall of said basket and a second position in which said portion is open.

* * * * *